Feb. 5, 1929.
A. P. TREDWAY
1,700,864
AUTOMATIC STEERING COLUMN LOCK
Filed March 17, 1928   2 Sheets-Sheet 1
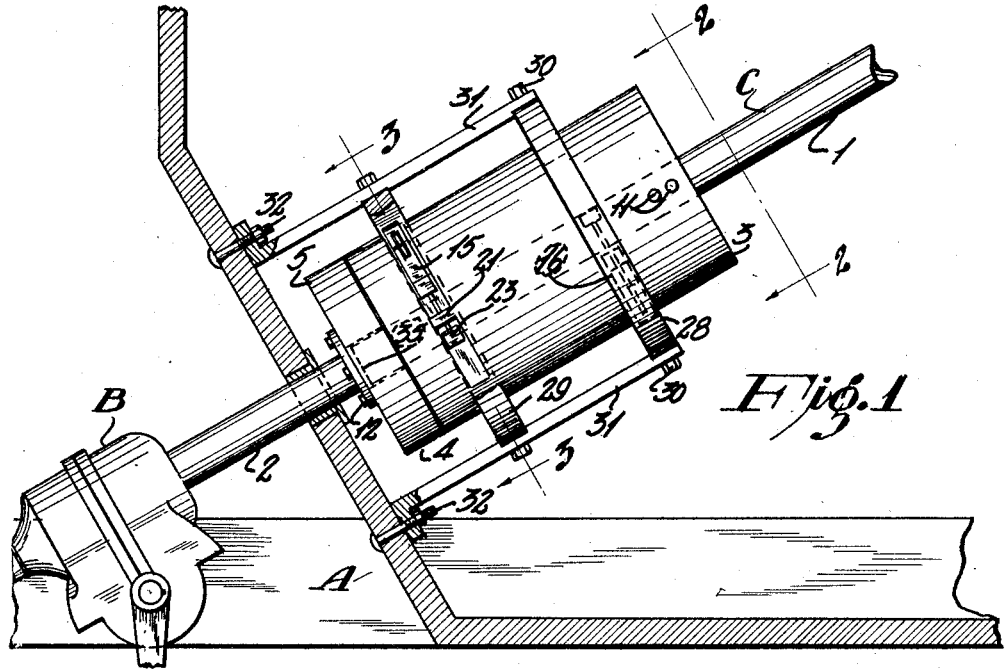
Fig.1
Fig.3
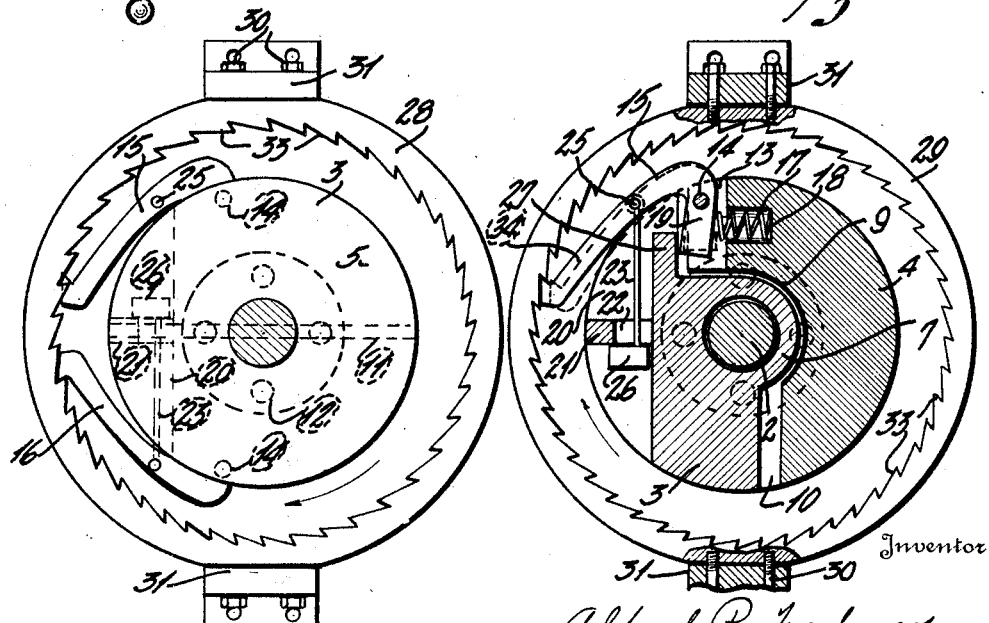
Fig.2
Inventor
Alfred P. Tredway
By Adam E. Fisher
Attorney Feb. 5, 1929. 1,700,864

A. P. TREDWAY

AUTOMATIC STEERING COLUMN LOCK

Filed March 17, 1928 2 Sheets-Sheet 2

Inventor
Alfred P. Tredway.
By Adam E. Fisher.
Attorney

Patented Feb. 5, 1929.

1,700,864

UNITED STATES PATENT OFFICE.

ALFRED P. TREDWAY, OF SHOALS, INDIANA.

AUTOMATIC STEERING-COLUMN LOCK.

Application filed March 17, 1928. Serial No. 262,498.

This invention relates to locking means for the steering elements of automobiles, tractors and the like.

The main object is to provide a device to mount upon the steering shaft of the vehicle whereby the front wheels of the same will be retained in any adjusted position until released by the driver.

Another object is to provide a lock which is automatic in action, being operated by the usual processes of steering and having no extra levers or wheels for the operation thereof.

Another object is to provide such a device which is positive in action, simple and sturdy in construction and which may be conveniently assembled upon the steering shaft of the vehicle.

With the foregoing and other objects in view the invention resides in the peculiar construction and arrangement of the parts as hereinafter set forth and claimed.

In the drawings:

Figure 1 is a side elevation, partly in section, of a portion of the frame of a motor vehicle showing the steering shaft with my invention, also shown partly broken away and in section, applied thereto.

Figure 2 is an enlarged end view on the sight line 2—2 in Figure 1, the steering shaft being shown in section.

Figure 3 is an enlarged section thereof taken along the line 3—3 in Figure 1.

Figure 4:
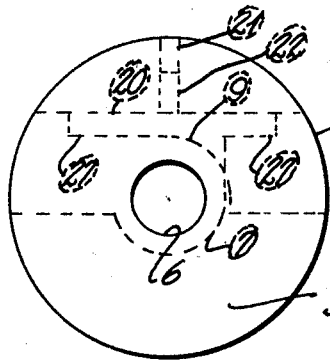
Figure 4 is an end view of one of the main castings making up the body of my invention.
Figure 5:
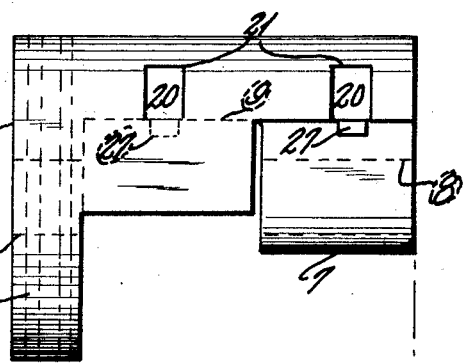
Figure 5 is a side view thereof.
Figure 6:
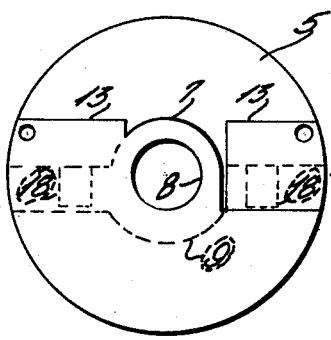
Figure 6 is an end view of the casting adapted for interfitting relationship with the casting as shown in Figures 4 and 5.

Referring now more particularly to the drawings, the reference character A indicates generally a portion of the frame of an automobile and B denotes the conventional assembly of worm and partial gear steering gear upon the steering shaft C. The steering shaft C in applying my invention thereto is cut or parted as indicated at the dotted line 35 in Figure 1 to form an upper portion 1 and lower portion 2.

In carrying out my invention I provide a main body portion or pawl carrier consisting of two complementary castings 3 and 4 adapted to interfit one within the other, as mounted upon the shaft section 1. In this purpose the castings are formed with circular face plates or portions 5 bored out centrally at 6, interlocking hubs 7 bored out at 8 in alignment with the bores 6, and complementary recesses 9 for the reception of the opposed hubs 7. The said castings 3 and 4 are so formed that, when assembled upon the shaft 1 there is sufficient space between the same as indicated at 10 in Figure 3, so that they may be rotated somewhat relative to each other. The said shaft section 1 is passed loosely through the apertures 6 and 8 in casting 4 and is secured to casting 3 by pins 11. Upon the lower edge of the face plate 5 of casting 4 the shaft 2 is secured in any suitable manner as by a flange bolted to the shaft at 12. Thus it may be understood that as the shaft C is turned the pawl carrying body comprising the two castings as set forth will turn upon the same axis, the casting 3 first turning within casting 4 until the space 10 is taken up.

Figure 7:
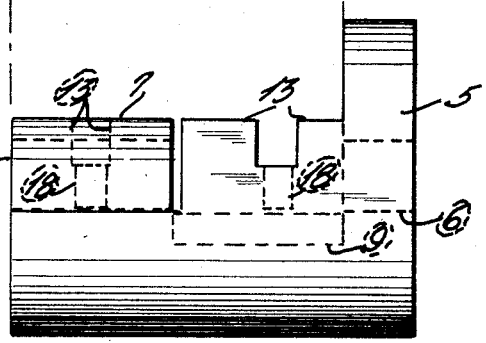
Figure 7 is a side view thereof.
Figure 8:
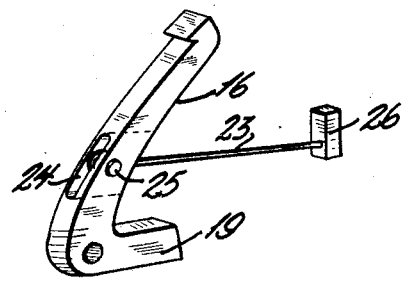
Figure 8 is a perspective view of one of the pawls and its associated elements.

The casting 4 has formed upon opposite sides of the axis thereof and obliquely situated as to each other at opposite ends of the casting, the spaced shoulders 13 as shown in Figure 7. Fulcrumed upon pins 14 between the shoulders 13 are the pawls 15 and 16, the same being spring set by coil springs 17 seated in sockets 18 and braced against the feet 19 of the said pawls. Grooves 20 are formed in the casting 3 in alignment with the said pawls 15 and 16, the said grooves being interrupted at their medial portions by bridges or stops 21 extended across the top thereof as shown, being in fact continuations of the casting at those points, and leaving passageways 22 beneath the stops. Pawl operating rods 23 are pivoted at one end in slots 24 in the pawls 15 and 16 by means of pins 25. The said rods 23 are passed through the passageways 22 in the grooves 20 and have at their opposite ends the catch blocks 26. Pawl operating shoulders 27 are formed in the casting 3 immediately below the grooves 20 and are adapted to bear upon the feet 19 of the pawls 15 and 16 as shown in Figure 3.

Internally toothed ratchet rings 28 and 29 are bolted as shown at 30 in spaced relation to standards 31 which are in turn bolted at 32 to the frame A of the automobile. The ratchet wheels 28 and 29 are positioned over the carrier or body portion in diametrical alignment with the pawls 15 and 16. The said ratchet wheels are provided with oppositely directed ratchet teeth 33 with which the pawls 15 and 16 are normally held in engagement by the coil springs 17.

In the use and operation of the device it will be understood that as the pawls 15 and 16 engage the ratchet teeth 33 of the rings 28 and 29 the lower portion 2 of the steering shaft C is secured from rotation thereby. By turning the upper portion 1 which is controlled by the steering wheel (not shown) the device is unlocked and the lower shaft 2 and consequently the steering gear B may be operated.

Referring to Figure 3 the shaft 1 is turned in the direction of the arrow. The casting 3, being secured thereto is caused to rotate within casting 4 so that the lower pawl operating shoulder 27 will force the foot 19 of lower pawl 15 downward against the spring 17. The outer end of the pawl 15 is thus disengaged from the teeth 33 of the ratchet ring 29, assuming the position shown in the dotted lines 34. Referring now to Figure 2 it will be noted that, as the casting 3 is rotated as set forth, the stop 21 thereon will impinge the catch block 26 upon pawl rod 23 extending from the upper pawl 16, so that the said pawl 16 will also be disengaged from the ratchet teeth 33 of ratchet ring 28. The device is now unlocked and the steering gear may be turned in the direction of the arrow. As the pressure is released from the steering shaft C the force of the springs 17 immediately relock the device, thereby holding the front wheels in any given set position. In the case of a turn opposite to the one as described the upper pawl 16 will be disengaged from the ratchet ring 28 by the upper pawl operating shoulder 27 and pawl 15 will be disengaged from the ratchet wheel 29 by its operating rod 23.

By means of the pawl operating rods 23 and their associated elements wear upon the ratchet teeth is eliminated, as without the said rods the pawls not being unlocked by the shoulders 27 would drag upon the teeth. If desired the ratchet rings 28 and 29 may be resiliently attached to the standards 31 by coil springs or the like (not shown) so that strain upon the same due to the wheels of the vehicle striking an obstruction in the road will be taken up.

It is obvious that the device is equally applicable to motor boats, launches and the like or wherever the conveyance is steered through a steering shaft.

While I have herein set forth a preferred embodiment of my invention it is understood that I may vary from the same in minor details of construction and assembly, not departing from the spirit of the invention and within the scope of the appended claims.

I claim:

1. In a motor vehicle steering device lock, in combination, a segmental steering shaft, a body portion comprising a pair of castings mounted in interfitting relationship, upon the said shaft, over the parted ends thereof, the upper casting being secured to the upper shaft section, and the lower casting to the lower shaft section, a plurality of opposed spring set pawls rockingly mounted in the body portion, and a plurality of internally toothed ratchet rings anchored to the vehicle frame and over the said body in diametrical alignment with and engaging the said pawls.

2. In a lock for a motor vehicle steering gear, in combination with a parted steering shaft, a pawl carrying body mounted thereupon, said body comprising a pair of complementary and spaced castings attached one each to the shaft sections and being rotatable upon a common axis, a plurality of spring set pawls rockingly mounted in the body portion and oppositely disposed relative to each other, pawl operating means extended therefrom, a plurality of internally toothed ratchet rings with oppositely directed teeth, said rings being mounted upon the frame of the vehicle and encircling the body portion in diametrical alignment with the pawls, the said pawls being adapted to engage the teeth of the ratchet rings.

3. In a lock for an automobile steering assembly, upper and lower steering shaft sections, a body portion comprising a pair of laterally interfitting spaced castings, one of which is secured to the said lower section of the steering shaft and has a pair of oppositely directed spring set pawls mounted upon opposite sides thereof, said pawls having pawl operating rods with catch blocks secured to them, the remaining casting being secured to the upper section of the steering shaft, and provided with a pair of grooves in alignment with the pawls of the companion casting, shoulders upon the said casting adapted to operate the said pawls, a pair of inwardly toothed ratchet rings with oppositely directed ratchet teeth, said ratchet rings being mounted upon the frame of the automobile and adapted to be releasably engaged by the pawls to lock the steering gear.

4. In a locking means for a steering device, in combination with upper and lower steering shaft sections, a pawl carrying body comprising a pair of castings mounted in co-operative interfitting relationship upon the steering shaft sections and adapted for angular displacement relative to each other, one casting being secured to the lower section and provided with spaced shoulders upon opposite sides and at opposite ends, the said casting having also spring set pawls rockingly mounted between the said shoulders, a plurality of pawl operating rods pivoted in the said pawls, catch blocks upon the said rods, the remaining casting being secured to the upper section of the steering shaft and having grooves with transverse stops therein for the reception of the said pawl operating rods, shoulders upon the said last named casting adapted to engage the said pawls, and a plurality of oppositely internally toothed ratchet rings operatively mounted over the assembly and adapted to be releasably engaged by the said pawls for the purpose set forth.

In testimony whereof I affix my signature.

ALFRED P. TREDWAY.